United States Patent
Shoukat

(10) Patent No.: US 9,800,198 B2
(45) Date of Patent: Oct. 24, 2017

(54) AUTOMATIC INTELLIGENT HYBRID ELECTRICITY GENERATING DEVICE

(71) Applicant: Rizwan Shoukat, Lahore (PK)

(72) Inventor: Rizwan Shoukat, Lahore (PK)

( * ) Notice: Subject to any disclaimer, the term of this patent is extended or adjusted under 35 U.S.C. 154(b) by 424 days.

(21) Appl. No.: 14/286,193

(22) Filed: May 23, 2014

(65) Prior Publication Data
US 2015/0340984 A1    Nov. 26, 2015

(51) Int. Cl.
| | |
|---|---|
| *H02J 1/10* | (2006.01) |
| *H02S 10/12* | (2014.01) |
| *F03D 7/04* | (2006.01) |
| *H02S 40/22* | (2014.01) |
| *F03D 9/00* | (2016.01) |
| *H02S 20/32* | (2014.01) |

(52) U.S. Cl.
CPC ............... *H02S 10/12* (2014.12); *F03D 7/04* (2013.01); *F03D 9/007* (2013.01); *H02S 20/32* (2014.12); *H02S 40/22* (2014.12); *Y02E 10/52* (2013.01); *Y02E 10/72* (2013.01); *Y10T 307/696* (2015.04)

(58) Field of Classification Search
CPC .......... H02S 10/12; H02S 20/32; H02S 40/22; Y10T 307/696
See application file for complete search history.

(56) References Cited

U.S. PATENT DOCUMENTS

| | | | | |
|---|---|---|---|---|
| 5,254,876 | A * | 10/1993 | Hickey | F03D 1/0608 290/44 |
| 7,045,702 | B2 * | 5/2006 | Kashyap | F03D 9/007 136/244 |
| 8,354,757 | B2 * | 1/2013 | Lee | F03D 9/00 290/44 |
| 2010/0090605 | A1 * | 4/2010 | Nevins | F03D 9/007 315/159 |
| 2010/0207453 | A1 * | 8/2010 | Ottman | F03D 9/007 307/72 |
| 2011/0133472 | A1 * | 6/2011 | Middendorf | F03D 1/001 290/55 |
| 2012/0112546 | A1 * | 5/2012 | Culver | H02J 7/0029 307/66 |
| 2012/0249047 | A1 * | 10/2012 | Kelly | H01M 10/465 320/101 |
| 2013/0206708 | A1 * | 8/2013 | Lessard | F24J 2/38 211/1.52 |
| 2014/0056707 | A1 * | 2/2014 | Donnelly | F03D 7/0204 416/9 |

* cited by examiner

Primary Examiner — Rexford Barnie
Assistant Examiner — Rasem Mourad
(74) Attorney, Agent, or Firm — Sarfaraz K. Niazi

(57) ABSTRACT

An automatic intelligent hybrid electricity generating device designed to get maximum electrical energy from renewable energy resources i.e., wind and sunlight and works intelligently and moves automatically to get maximum available energy resources i.e., sunlight or wind, thereby eliminating separate installation of solar panels and wind turbine and increases efficiency.

1 Claim, 7 Drawing Sheets

AUTOMATIC INTELLIGENT HYBRID ELECTRICITY GENERATING DEVICE

BACKGROUND OF THE INVENTION

Conventionally fixed solar panels and wind turbines are installed separately and are used to generate electricity from sunlight and wind respectively. In the case of fixed solar panels, a large number of solar cells, installation stands, wiring cables, large area of space, inverter, charge controller, battery bank and continuous and specific intensity of solar light are required to generate electricity from sunlight. In the case of wind turbine, blades, gear box, generator, installation stand, wiring cables, converter, inverter, charge controller and a specific wind speed are required to generate electricity from wind.

BRIEF SUMMARY OF THE INVENTION

The invention integrates solar panel and horizontal axis wind turbine. The device consists of a solar cell which is fixed in front of three blades of the horizontal axis wind turbine. When the speed of wind is less than a specific value, the three blades moves in such a position that they can focus the maximum sunlight on the solar cell and simultaneously it tracks the maximum light direction and rotates the device in the direction of maximum sunlight. When the speed of wind is more than a specific value, the wind energy is converted into electrical energy by the rotation of three blades and a dc generator. The tail of the HWAT tracks the directions of wind and rotates it automatically. Simultaneously, the solar cell also converts the available sunlight into electrical energy.

By using the techniques of increasing the light intensity by convergence, automatic tracking of maximum light and wind energy, integration of wind turbine and solar cell, the device is designed.

DETAILED DESCRIPTION OF THE INVENTION

Figure 1:
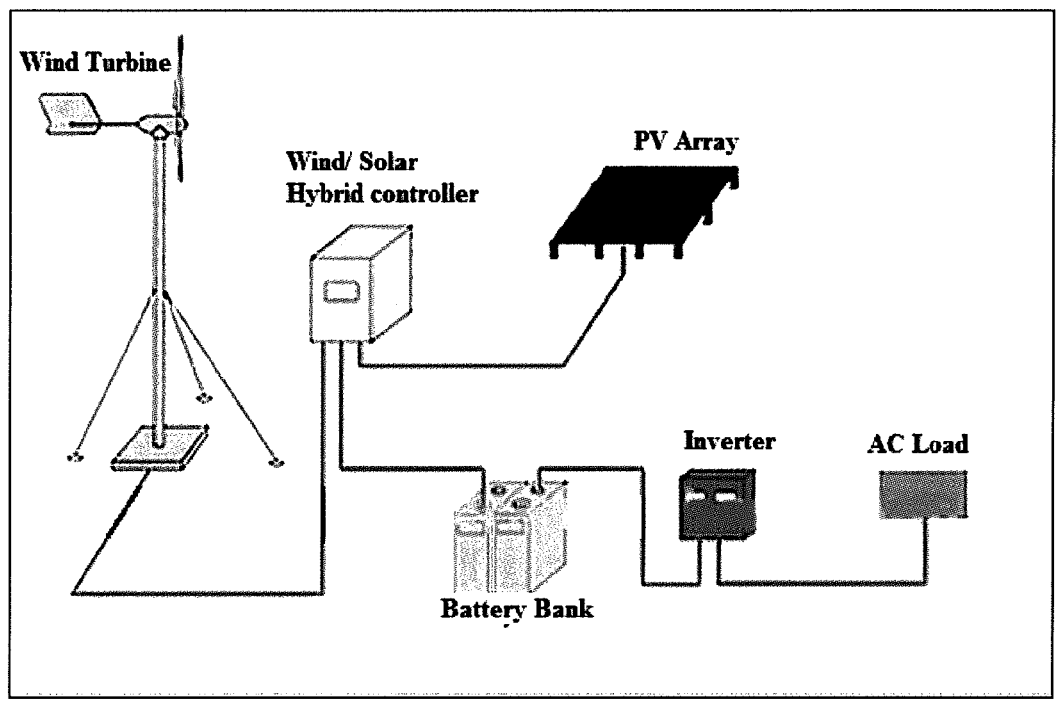
FIG. 1 depicts a conventional wind turbine and solar panel system.
Figure 2:
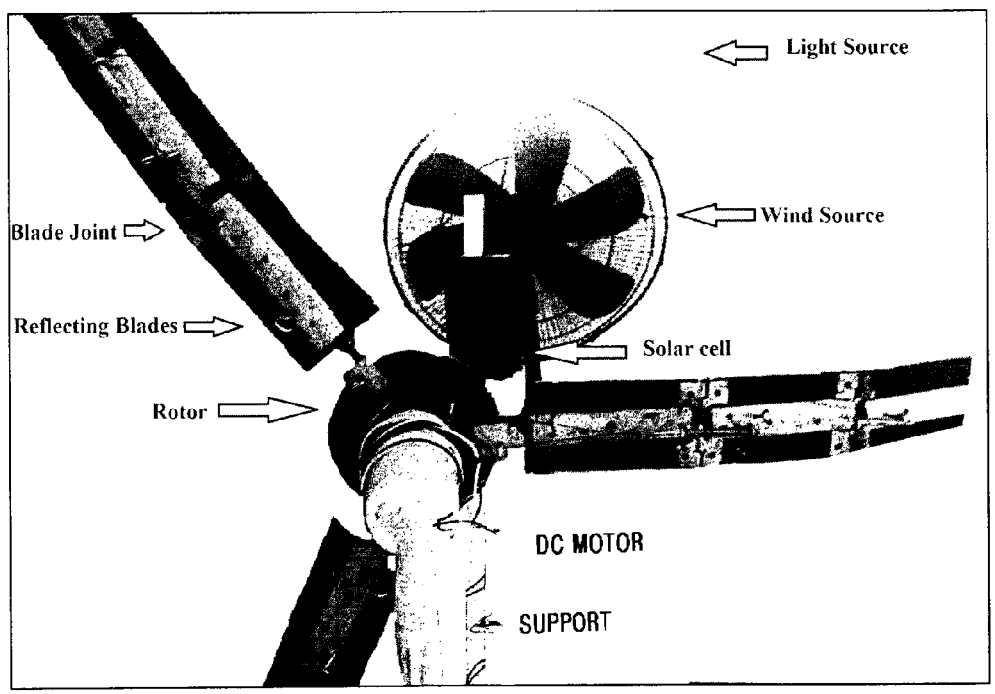
FIG. 2 depicts the design of a hybrid device.
Figure 3:
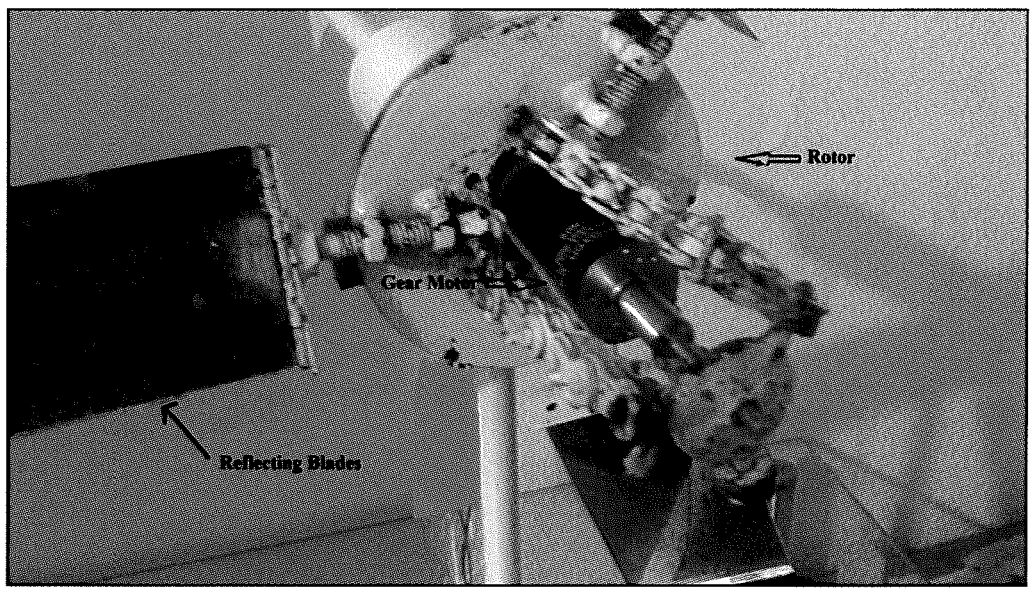
FIG. 3 depicts the design of the rotor.

The device consist of a solar cell fixed in front of three blades having a reflecting surface, DC generator, a mechanism to control the movement of three blades horizontally and vertically to focus the sunlight on the solar cell, sensors to track the maximum sunlight direction and wind speed, and a control circuit to generate maximum electricity.

A crystalline solar cell of 2.5×3.5 inches is selected to convert the light energy into electrical energy. The size of the solar cell is the same as the size of a reflecting blade cell in order to converge the maximum light on the surface of a solar cell to avoid light energy loss and to also reduce wind hindrance and wind energy loss. The solar cell is fixed in front of the rotor through an iron support fixed with the pole of the turbine. The distance between the solar cell center of the rotor is one foot. By this design, the solar cell can rotate 360° along with the turbine assembly but remains in the focal point of reflecting blades.

There are three blades used in the design of wind turbine. The length of the blades is 10 inches. Each blade consists of three unit cells having a size of 2.5×3.5 inches and having a reflecting surface to extract the wind and light energy. The size of the blade unit cell is the same as the size of a solar cell in order to extract maximum solar energy. The three blades are fixed on the surface of a rotor but can move horizontally and vertically simultaneously.

All the blades can move horizontally to change the angle of tilt (0 to 45). The motion is controlled by a DC gear motor. By the horizontal motion of the blades, the turbine can extract the kinetic energy of wind and rotate the rotor.

In the vertical motion of the blades, all the unit cells are moved to form a dish shape so that the light can be focused on the solar cell. The blade cells are attached with each other through moveable joints. The vertical motion is controlled by a DC gear motor.

A special rotor is designed for the hybrid machine. Three blades are fixed on it but can rotate horizontally and vertically. A DC gear motor is fixed on the rotor to change the tilt angles of blades horizontally and vertically simultaneously through a special mechanism. When the DC motor moves in the clockwise direction, the blades form a dish shape and when the DC motor moves in an anticlockwise direction, the blades are straight and tilted 30 degrees horizontally to extract the kinetic energy of wind and rotate the rotor in the anticlockwise direction. The rotor is attached with a DC generator. Hence, it rotates the generator.

A DC generator is used in the hybrid machine to covert the rotational energy of rotor into DC electrical energy. It is fixed in the nacelle. It consists of fixed magnets, armature, shaft, commutators, carbon brushes and an outer body.

A triangular tail fin is used in the hybrid machine, attached with the nacelle through a boom. It rotates the machine assembly in the wind direction and aligns the blades in the direction of wind so that maximum wind energy can be converted into electrical energy.

A steel pipe is used as a pole/tower in the machine. It is attached under the nacelle. The lower end of the pipe is fixed in a bearing. The bearing is fixed in a frame of strong glass. This allows the machine to rotate by 360 degrees to track the maximum wind or solar power. Further, the design of the pole i.e., hole type allows an efficient path for the routing of wires of the generator, solar cell, DC gear motor and sensors.

A circuit is designed to control the horizontal and vertical motions of blades and track the maximum light intensity and move the hybrid machine in the maximum light intensity. A pic16f877 is used in the circuit to compare the input values of two LDR sensors and move a DC motor to rotate the whole assembly by the tower pipe. The circuit operates on 12 volts input power supply.

Figure 6:
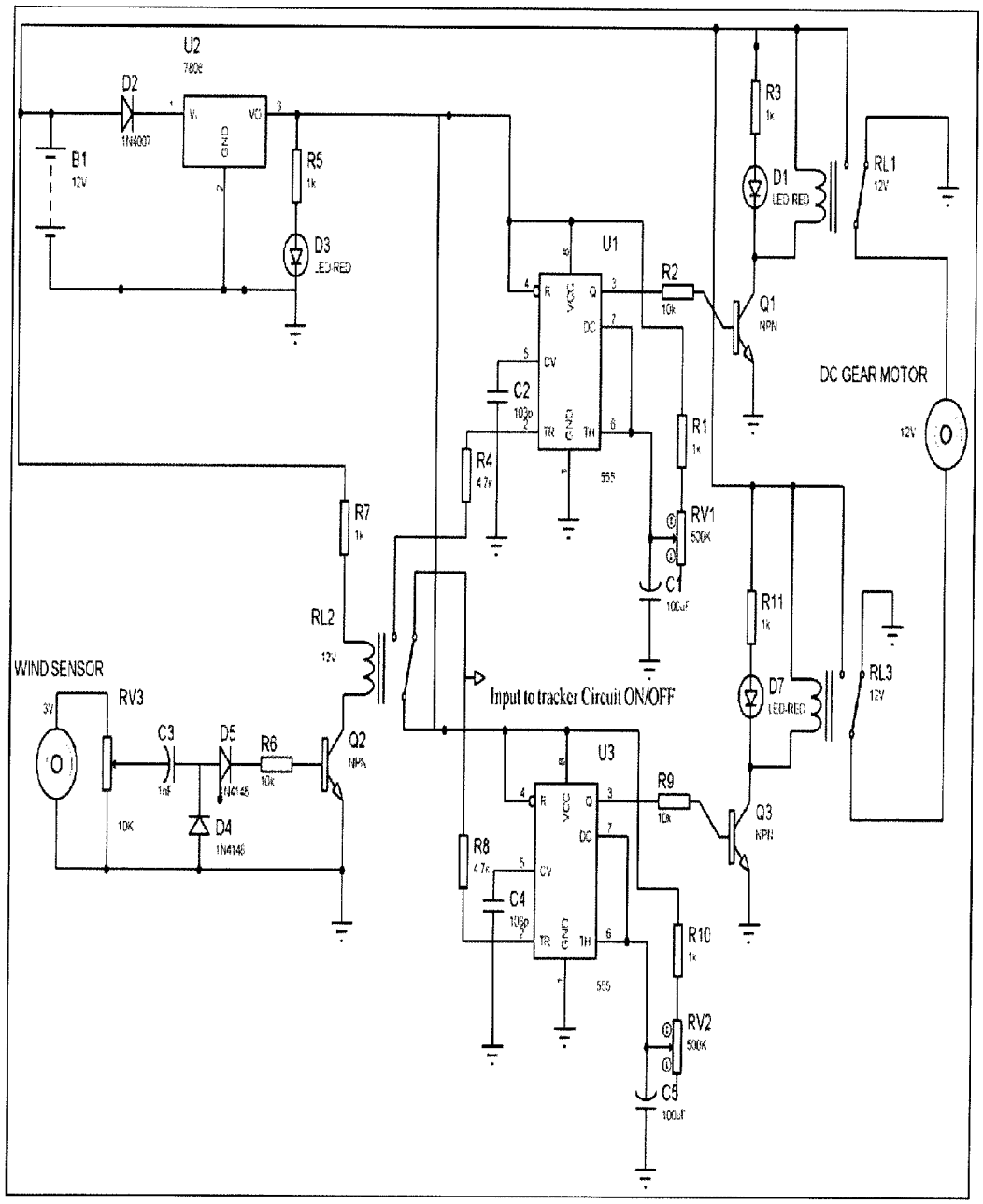
FIG. 6 depicts solar tracking Circuit "A"
Figure 7:
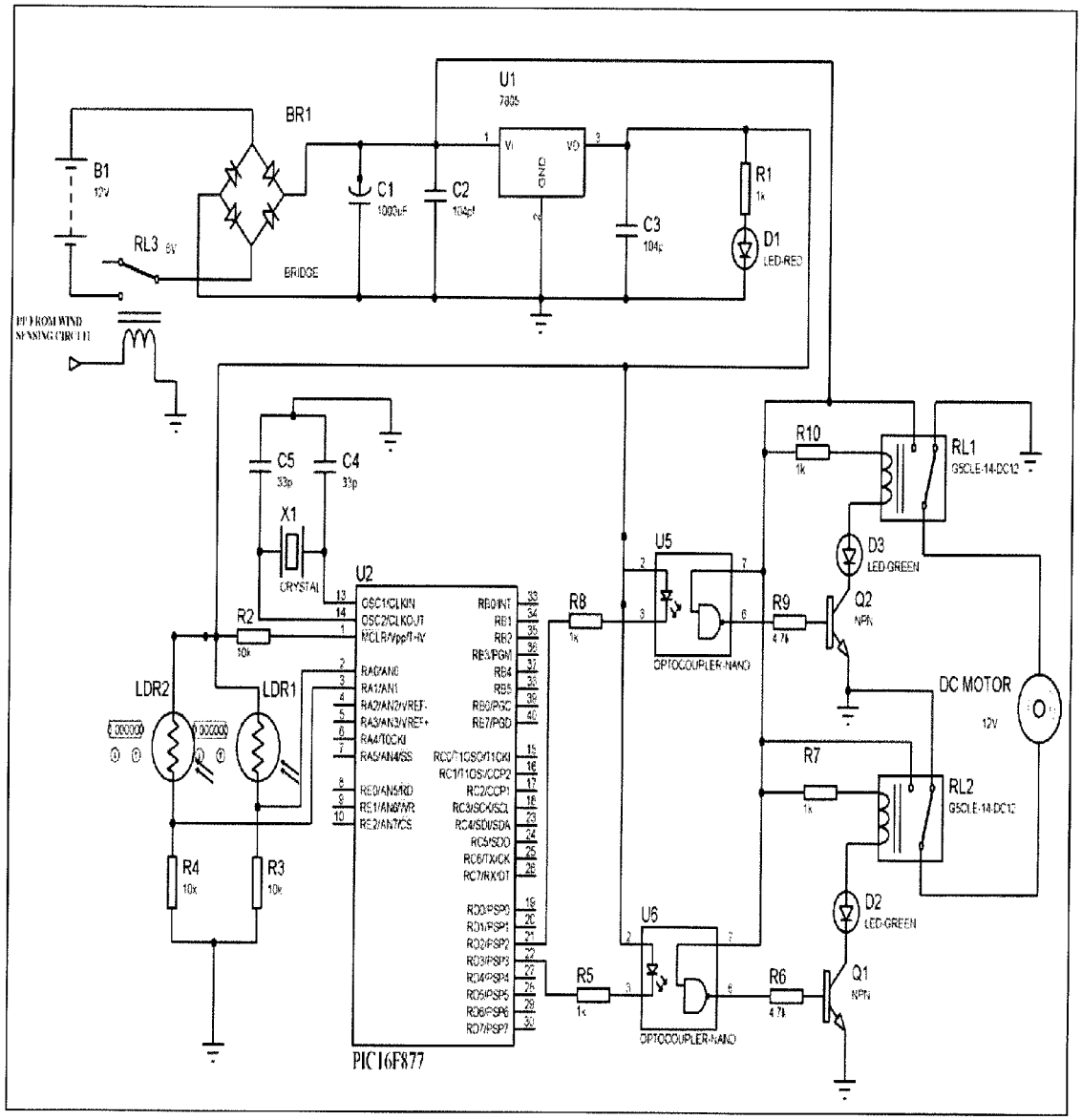
FIG. 7 depicts wind sensing and motion of blades Circuit "B"

There are two circuits used in the hybrid machine i.e., circuits A and B. (FIGS. 6 and 7)

The Circuit "A" consists of pic16F877 microcontroller, power supply unit, light sensing LDRs and relays H Bridge. It is used to track the maximum light and move the machine in the direction of light so that maximum light can be focused on the solar cell. The power supply unit converts +12 dc volts to +5 volts dc for the pic16f877 operations. Two light dependent resistances LDR1 and LDR2 are used to track the maximum light. The pic compares the values of LDR1 and LDR2 sensors. If found different, it turns on the relay RL2 when LDR1 receives high intensity of light than LDR2 and turns on RL1 relay when LDR2 receives high intensity of light than LDR1. The two relays RL1 and RL2 are used as H bridge to move DC motors clockwise and anticlockwise. So DC motor moves clockwise or anticlockwise until the values of LDR1 and LDR2 become equal i.e., the hybrid machine aligns in the direction of maximum light. The circuit "A" turns ON only when there shall be no wind speed in order to conserve the energy loss.

Circuit "B" consist of wind speed sensing unit, power supply, two 555 timers and relays H Bridge. The power supply unit converts +12 dc volts to +6 dc volts for the operation of 555 timers. A small dc motor is used to sense the speed of wind, when it senses the wind speed greater than certain point, it turns on the relay RL2, which triggers the Timer 1(U1) and turns OFF the circuit "A" so that the tracking of sunlight may be closed and tracking of wind may be carried out. When the wind sensor senses the wind speed less than the certain point, then it turns off the relay RL2, which triggers the Timer 2(U2) and also turns ON the circuit "A" so that tracking of sunlight may be carried out. The Timer1 and Timer2 turn ON the relay 1 and relay 3 for a certain period of time. The relays operate the DC gear motor in clockwise and anticlockwise directions for a certain period of time. The motions of DC motor are used to perform the horizontal and vertical motions of blades i.e., when there shall be wind of a certain speed, it shall straight and tilt the blades so that the hybrid machine can extract maximum wind energy and when there shall be less speed of wind from the set point then it will turn the blades in the dish type shape so that the hybrid machine can extract maximum light energy.

The pie 16F877 is programmed by writing the code in C compiler which is given below.

```
#include <16F877a.h>
#use        delay (clock = 20000000)
#DEFINE relay1      PIN_D2
#DEFINE relay2      PIN_D3
void        process_ldr( );
int32       adc_value2;
int16       ldr1_value, ldr2_value;
/////////////////////////////////
void main( ){
        setup_port_a(All_ANALOG);
        output_high(relay1);
        output_high(relay2);
/////////////////////////////////
        while(TRUE){
            process_ldr( );
            delay_ms(10);
            }
}
/////////////////////////////////
void process_ldr( )
{
        set_adc_channel(0);
        delay_ms(1);
        adc_value2 = Read_ADC( );
        delay_ms(1);
        ldr1_value = adc_value2;
/////////////////////////////////
        set_adc_channel(1);
        delay_ms(1);
        adc_value2 = Read_ADC( );
        delay_ms(1);
        ldr2_value = adc_value2;
        if(ldr1_value > 200){
        output_low(relay2);
        }
        else{
        output_high(relay2);
        }
        if(ldr2_value > 200){
        output_low(relay1);
```

```
        }
        else{
        output_high(relay1); } }
```

Figure 4:
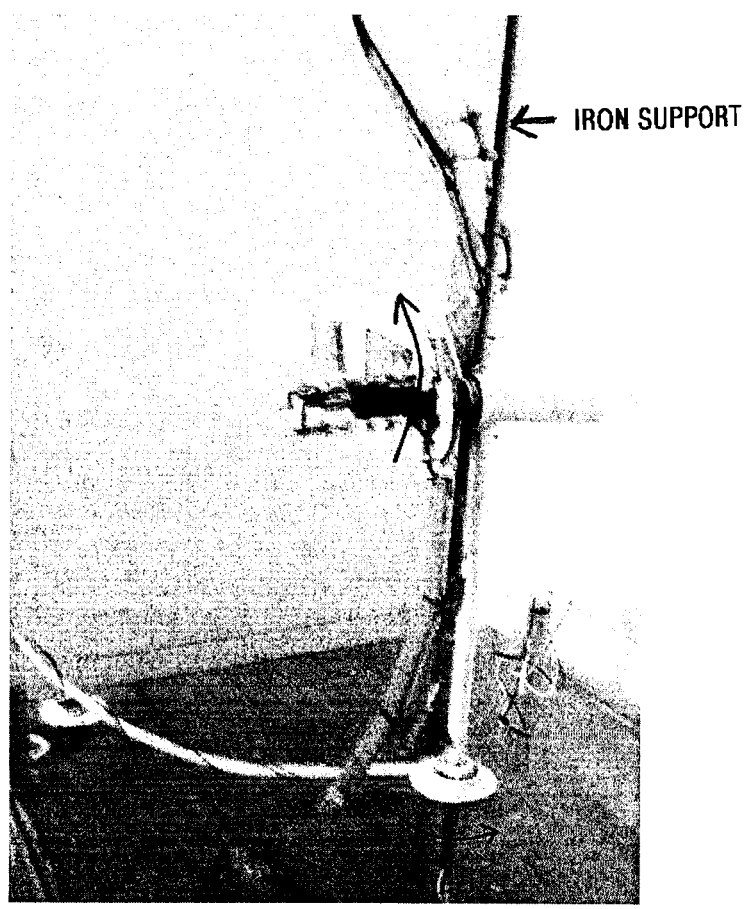
FIG. 4 depicts the hybrid design.
Figure 5:
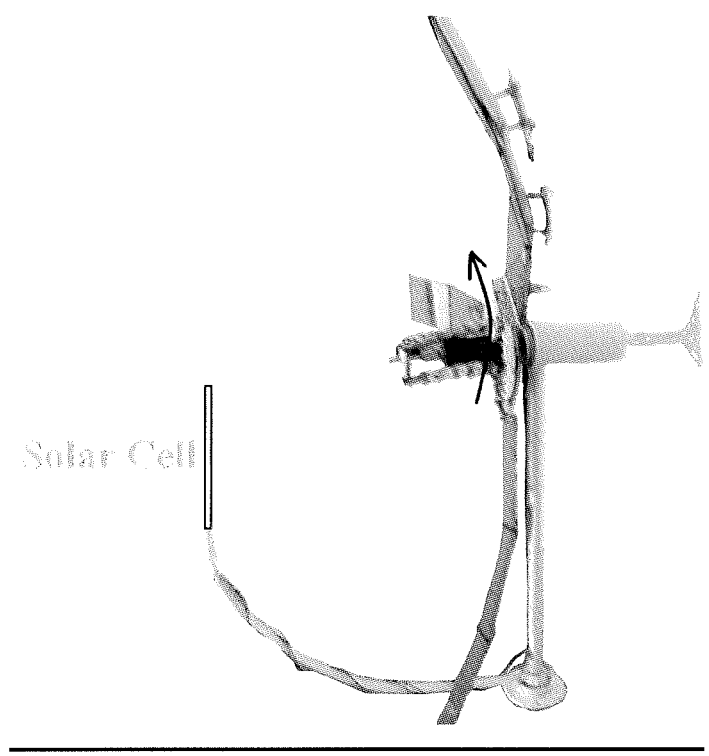
FIG. 5 depicts the device.

The hybrid device is designed such that it can generate maximum electrical energy from the maximum available renewable energy resource i.e., sunlight or wind. Its functionality is automatic i.e., human independent (See FIG. 4).

When there will be high speed of wind more than a specific value, then the wind energy shall be converted into electrical energy by the rotation of three blades and DC generator. The tail fin will move the machine in the direction of wind so that the blades can experience the maximum force of wind and rotor can rotate the generator with high speed. Simultaneously, the solar cell also continues to convert the available sunlight into electricity in the direction of wind.

When the speed of wind is less than a specific value, the circuit "B" senses it by a small DC motor and moves the three reflecting blades in such a position that they can focus the maximum sunlight on the solar cell and simultaneously, the circuit "A" also starts to track the maximum light intensity direction using the LDRs (Sensors) and DC motor and rotates the machine in the direction of maximum sunlight. Hence, by using the techniques of light convergence, tracking of sunlight and automation, a hybrid solar cell and wind turbine machine is designed.

In order to analyze the efficiency of hybrid device over the conventionally used solar cell and wind turbine, an experiment is conducted in two phases under the same circumstances i.e., source of light, source of wind, constant distances from energy sources to the solar cell, wind turbine, temperature etc. Furthermore, to calculate the per day power, average per day wind hours are taken as 10 hours and per day solar hours are selected as 9 hours.

In the first phase, as conventional, the solar cell and wind turbine will be exposed to light source of light i.e., 200 watts bulb and wind source i.e., pedestal fan respectively and generated power will be calculated by using an ammeter and volt meter.

In the second phase, the specially designed Automatic Intelligent Hybrid Electricity Generating Device having the same solar cell and wind turbine will be exposed to same light source and wind source respectively as used in first phase and generated power will be calculated by using the same ammeter and voltmeter as given below.

To calculate the efficiency of the hybrid device over the conventional solar and wind turbine, first increase of power is required to be calculated.

Increase of power by the Hybrid device=(Total energy by hybrid device)−(Total energy by conventional solar cell and wind turbine)=9.363 Wh/day Increase in efficiency by the Hybrid device=63.29%

What is claimed is:
1. A hybrid electricity generating device comprising:
a. a wind turbine with three blades approximately 10 inches long connected to a rotor rotating in a horizontal and a vertical direction;
b. a dc gear motor and a dc generator connected to the rotor to generate electricity through the rotation of the blades;
c. three reflective surfaces, each measuring 2.5×3 inches disposed on each of the blades to make them reflect light;

d. a solar panel comprising three crystalline solar cells of the same dimension as the reflective surfaces disposed on the blades and facing the blades in the same arrangement as the reflective surfaces disposed on the blades and in the path of the light reflected from the blades to convert reflected light into electrical energy;

e. a solid support connecting the solar panel to the wind turbine to keep it facing the blades at 12 inches when the blades move in the horizontal and vertical direction.

* * * * *